United States Patent [19]

Okita et al.

[11] Patent Number: 4,632,878

[45] Date of Patent: Dec. 30, 1986

[54] MAGNETIC RECORDING MEDIUM

[75] Inventors: Tsutomu Okita; Hiroshi Hashimoto, both of Kanagawa; Akiyoshi Hashimoto; Teruo Nakagawa, both of Aichi; Hiroyuki Kato, Aichi, all of Japan

[73] Assignee: Fuji Photo Film Co., Ltd., Kanagawa, Japan

[21] Appl. No.: 768,007

[22] Filed: Aug. 21, 1985

[30] Foreign Application Priority Data

Aug. 21, 1984 [JP] Japan ................. 59-172349

[51] Int. Cl.$^4$ ................. G11B 5/70
[52] U.S. Cl. ................. 428/425.9; 252/62.54; 360/134; 360/135; 360/136; 427/44; 427/128; 428/522; 428/694; 428/900
[58] Field of Search .......... 427/44, 128, 131; 428/694, 900, 425.9, 522; 360/134–136; 252/62.54

[56] References Cited

U.S. PATENT DOCUMENTS

| | | | |
|---|---|---|---|
| 4,004,997 | 1/1977 | Tsukanoto et al. | 428/900 |
| 4,343,831 | 8/1982 | Tsuji | 427/44 |
| 4,407,853 | 10/1983 | Okita | 427/44 |
| 4,428,974 | 1/1984 | Okita | 427/44 |
| 4,448,846 | 5/1984 | Chang | 428/412 |
| 4,448,848 | 5/1984 | Okita | 428/447 |
| 4,482,610 | 11/1984 | Okita | 428/483 |
| 4,518,656 | 5/1985 | Okita | 428/403 |

Primary Examiner—Ellis P. Robinson
Attorney, Agent, or Firm—Sughrue, Mion, Zinn, Macpeak, and Seas

[57] ABSTRACT

The present invention relates to a magnetic recording medium prepared by the process comprising (1) coating a magnetic coating composition mainly containing ferromagnetic particles and a binder on a support and (2) irradiating the resulting support with electron beams, wherein the binder contains a compound represented by the following formula,

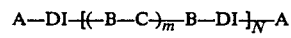

$$A-DI-[(-B-C-)_m-B-DI-]_N-A$$

wherein A represents a radical of a hydroxy compound containing at least one isocyanurate ring and at least one (meth)acryloyl group; DI represents a radical of an organic diisocyanate compound; B represents a radical of a polyol having at least two hydroxy groups; C represents a radical of a polybasic acid having at least two carboxy groups; m is a number of 1 to 7; and N is a positive number of 7 or less.

10 Claims, No Drawings

MAGNETIC RECORDING MEDIUM

FIELD OF THE INVENTION

The present invention relates to a magnetic recording medium such as a video tape, an audio tape or a computer tape. More particularly, the present invention relates to a magnetic recording medium having excellent durability.

BACKGROUND OF THE INVENTION

Magnetic recording media widely used generally contain a thermoplastic resin such as a vinyl chloridevinyl acetate resin, a vinyl chloride-vinylidene chloride resin, a cellulose resin, an acetal resin, a urethane resin or an acrylonitrile butadiene resin, alone or in combination, as a binder. However, such magnetic recording media or magnetic tapes suffer inferior wear resistance of the magnetic layer and stains in the tape path.

It is known that a thermosetting resin such as a melamine resin or a urea resin can be used as a binder and that a binder which is cross-linked by a chemical reaction such as an isocyanate compound or an epoxy compound can be added to the above described thermoplastic resin. However, the use of the cross-linkable binder is accompanied with such defects that (1) a resin solution having dispersed therein magnetic particles has poor storage stability, that is, the pot life is short, the physical properties of the magnetic coating composition are not homogeneous and the magnetic tape does not have a homogeneous quality, and that (2) after the magnetic coating composition is coated and dried, heat treatment for hardening the coated layer is necessary. That is, a long period of time for manufacturing the product is necessary.

U.S. Pat. Nos. 3,871,908 and 4,443,490, Japanese Patent Publication (examined) No. 12423/1972, Japanese Patent Publication (unexamined) Nos. 15104/1972 and 77433/1975 disclose methods for preparing a magnetic recording medium by irradiating electron beams on the coating composition comprising an oligomer or a monomer of arcylic ester as a binder for hardening after drying in order to remove the above-described disadvantages. However, a magnetic recording medium having excellent electromagnetic properties and running durability cannot be obtained by the above-described method.

Recently, it has been required that the support of magnetic tapes be as thin as possible in order to allow recording for a long time, and the mechanical properties of the magnetic layer are rquired to be improved. For example, magnetic tapes are required to be used under severe conditions as video cassette recorders become multifunctional. However, heretofore, satisfactory physical properties meeting the above-described requirements have not been provided with a magnetic layer.

SUMMARY OF THE INVENTION

An object of the present invention is to provide a magnetic recording medium having excellent electromagnetic properties.

A second object of the present invention is to provide a magnetic recording medium comprising a magnetic layer having excellent mechanical properties.

A third object of the present invention is to provide a magnetic recording medium having homogeneous efficiency and to provide a magnetic coating composition having good storage stability.

A fourth object of the present invention is to provide a magnetic recording medium having excellent durability.

A fifth object of the present invention is to provide a magnetic recording medium having excellent durability at high temperatures.

A sixth object of the present invention is to provide a magnetic recording madium which is prepared without heat-treatment for hardening a coated layer.

Extensive researches have been made in order to remove the disadvantages involved in the conventional methods of using a thermoplastic resin and a thermosetting resin, adding a binder cross-linkable with a chemical reaction thereto, and using a curable binder cross-linkable with electron beams. As a result, the present invention has been attained.

That is, the present invention provides a recording medium comprising a support having coated thereon a magnetic layer, wherein the magnetic layer contains, as a binder, a compound represented by the following formula which is then irradiated with electron beams,

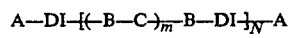

wherein, A represents a radical of a hydroxy compound containing at least one isocyanurate ring, a hydroxyl group and at least one acryloyl group and/or methacryloyl group; DI represents a radical of an organic diisocyanate compound; B represents a radical of a polyol which is dihydric or more; C represents a radical of a polybasic acid which is dibasic or more; m is a number of 1 to 7; and N is a positive number of 7 or less.

DETAILED DESCRIPTION OF THE INVENTION

The features of the present invention reside in the use of the compound represented by the above general formula as a binder, which is exposed to electron beam irradiation, whereby a magnetic recording medium having extremely improved electromagnetic properties, running properties and durability can be obtained.

In the general formula of the compound as a binder, A is a radical of a hydroxy compound containing at least one isocyanurate ring and at least one (meth)acryloyl group. Specific examples thereof include radicals of monoacrylate, diacrylate, monomethacrylate and dimethacrylate of an adduct of ϵ-caprolactone with tris-2-hydroxyethyl isocyanurate or tris-2-hydroxyethyl isocyanurate. Among these a radical of diacrylate and that of dimethacrylate are preferred.

DI is a radical of an organic diisocyanate compound. Specific examples thereof include radicals of 2,4-tolylene diisocyanate, 2,6-tolylene diisocyanate, 1,3-xylylene diisocyanate, 1,4-xylylene diisocyanate, diphenylmethane-4,4'-diisocyanate, naphthalene diisocyanate, tolidine diisocyanate, isophoron diisocyanate and dicylohexylmethane-4,4'-diisocyanate.

B represents a radical of a polyol having at least two hydroxy groups. Preferred examples thereof include radicals of dihydric alcohols such as trimethylene glycol, butanediol, neopentyl glycol, hexanediol or cyclohexanediol, and a radical of dihydric alcohol containing at least 50 mole% of the above-described dihydric alochol. Radicals of trihydric alcohols such as trimethylolpropane can also be used.

C represents a radical of a polybasic acid having at least two carboxyl groups. Preferred examples include radicals of at least one dibasic acid selected from the group consisting of adipic acid, sebacic acid, cyclohexanedicarboxylic acid, a phthalic acid, isophthalic acid and terephthalic acid, and radicals of tribasic carboxylic acids such as trimellitic acid.

m is a number of from 1 to 7 preferably from 2 to 5, and N is a positive number of 7 or less, preferably from 2 to 6.

When m exceeds 7, the strength of a magnetic layer as well as the durability are not enough. When N exceeds 7, the durability particularly deteriorates.

The content of (meth)acryloyl group in the binder of the present invention is preferably 0.0010 to 0.0025 g equivalent/g, more preferably 0.0010 to 0.0022 g equivalent/g. When the amount of (meth)acryloyl group is less than the above range, the hardening property deteriorates. When it is more, the tape becomes brittle and its durability is insufficient.

The theoretical equivalent relationship of the starting materials for preparing the binder used in the present invention is as follows.

(The OH equivalent of the polyester polyol)+(the OH equivalent of the mono- and/or di(meth)acrylate containing an isocyanurate ring and a hydroxyl group)=(the NCO equivalent of an organic diisocyanate).

The content of the isocyanurate ring is in the range of from 67 to 2 mole%, preferably from 15 to 4 mole%, based on the total amount of the each radical in the compound represented by the general formula.

In actuality, the OH equivalent of the mono- and/or di(meth)acrylate containing a hydroxyl group can be by 10% more or less than the theoretical equivalent.

One example of a method for preparing the binder of the present invention is as follows:

(m+1) mol of glycol containing 50 mol% or more of neopentyl glycol and/or butanediol is added to "m" mol of adipic acid, to give the theoretical amount for the esterification reaction to provide a polyester polyol having an average condensation degree of m. Generally, the molar ratio of the polybasic acid to the polyol is in the range of from 1.02 to 4.

(N+1) mol of organic diisocyanate is added to N mol of polyester polyol, to give the theoretical amount, and the mixture is heated to 40° to 100° C., preferably 60° to 90° C., to provide a polyester containing diisocyanate at the terminal and having an average condensation degree of N (first reaction step). Generally, the molar ratio of the polyester polyol to the diisocyanate is in the range of from 1.0 to 4.0, preferably from 1.0 to 2.5.

In a second step following the first step, an organic diisocyanate which is necessary for providing urethane poly(meth)acrylate having a condensation degree of N=0 in a predetermined amount is added to the reaction mixture prepared in the first step. The content of the urethane poly(meth)acrylate having a condensation degree of N=0 is in the range of from 5 to 40 wt%, preferably 10 to 30 wt% based on the total amount of said urethane poly(meth)acrylate. If the above content is less than the lower limit, the modulus of elasticity and the cross-linking defficiency of the binder is insufficient thereby the durability of the magnetic recording medium thus-obtained is insufficient. If said content is more than the upper limit, the resulting binder is too brittle.

Hydroxyl group-containing di(meth)acrylate is added in an amount equivalent to the total amounts of the isocyanate equivalent in the polyester containing diisocyanate at the terminal in the reaction mixture prepared in the first step and of the isocyanate equivalent in the newly added organic diisocyanate. Generally, the ratio of the total isocyanate equivalent to the hydroxy equivalent of the added hydroxy group-containing di(meth)acrylate is in the range of from 0.3 to 2.0. Then, the binder suitable for the invention is obtained, which is a composition comprising polyester urethane poly(meth)acrylate having an average condensation degree (N) of 2 to 7 and urethane poly(meth)acrylate having a condensation degree (N) of 0, and having 0.0010 to 0.0025 g equivalent of (meth)acryloyl group per g of total amount of the polyester urethane poly(meth)acrylate and urethane poly(meth)acrylate.

For the binder used in the present invention, "N" can be a positive number of 7 or less on the average. Urethane poly(meth)acrylate having a condensation degree (N) of 0 need not be included. In this instance, the organic diisocyanate need not be added in the second reaction step.

An additive amount of the organic diisocyanates in the first step and the second step can be calculated by determining each starting material to be used, the concentration of equivalent of (meth)acryloyl group in the composition and "m" and "N" in the above-described general formula. That is, the binder used in the present invention can be obtained by introducing starting materials in predetermined amounts so as to have a desired degree of urethane condensation and terminating the first step reaction, further adding an organic diisocyanate compound in such an amount that the (meth)acryloyl group in the resulting composition can have high concentration so as to be curable enough and adding mono- and/or di(meth)acrylate containing a hydroxyl group in an amount sufficient to react with all of the NCO groups in the reaction system.

As to the binder used in the present invention, the mixing ratio of polyester urethane poly(meth)acrylate having an average condensation degree (N) of 2 to 7 and urethane poly(meth)acrylate having a condensation degree (N)=0 and the equivalent amount of (meth)acryloyl group per g of the total amounts of the above-described two compositions can be calculated as follows.

The molecular weight of the polyester urethane poly(mthe)acrylate having an average condensation degree (N) of 2 to 7 is assumed to be A (the (meth)acryloyl equivalent of the compound is 4) and that of the urethane poly(meth)acrylate is assumed to be B (the (meth)acrylate equivalent of the compound is 4).

The amount of the polyester urethane poly(meth)acrylate per g of the sum of the polyester urethane poly(meth)acrylate and the urethane poly(meth)acrylate is assumed to be a g, and that of the urethane poly(meth)acrylate is assumed to be b g.

When the (meth)acryloyl equivalent to be calculated is assumed to be X, the following relationship is noted.

$$a + b = 1$$

$$X = 4 \times \frac{a}{A} + 4 \times \frac{b}{B}$$

Therefore, a and b can be controlled by X, and X can be controlled by a and b.

The binder used in the present invention can contain a thermoplastic resin such as a copolymer of vinyl chloride and vinyl acetate, a copolymer of vinyl chloride, vinyl acetate and maleic acid, a copolymer of vinyl chloride, vinyl acetate and vinyl alcohol, nitrocellulose, acetyl butyl cellulose, a formal resin, an acetal resin or a butyral resin in amount of 80 wt% or less, preferably 50% or less, and more preferably 30 wt% or less based on the total amount of binder; or a polymerizable compound having one carbon-carbon unsaturated bond in the molecule and capable of being polymerized by electron beams such as (meth)acrylate ester, (meth)acrylamide, an allyl compound, a vinyl ether, a vinyl ester, a vinyl heterocyclic compound, an N-vinyl compound, a styrene type compound, a crotonic acid type compound, an itaconic acid type compound and an olefin type compound, in amount of preferably 40 wt% or less and more preferably 20 wt% or less based on the total amount of the binder; in order to improve electromagnetic properties and running properties.

Ferromagnetic particles used in the present invention include ferromagnetic iron oxide particles, Codoped ferromagnetic iron oxide particles, ferromagnetic chromium dioxide particles, and ferromagnetic alloy particles and barium ferrite. Effective acicular ratio of ferromagnetic iron oxide and chromium oxide is 2/1 to 20/1, preferably 5/1 or more and an averge length thereof is about 0.2 to 2.0 $\mu$m. Ferromagnetic alloy particles have a metal content of 75 wt% or more, 80% or more of the metal content is ferromagnetic metal (i.e., Fe, Co, Ni, Fe-Co, Fe-Ni, Co-Ni, Fe-Co-Ni), and the longest diameter is about 1.0 $\mu$m or less.

The binder of the present invention is used in an amount of from 12 to 300 wt%, preferably from 15 to 100 wt% based on the amount of the ferromagnetic particles.

Organic solvents to be used for dispersing ferromagnetic particles and coating a coating composition include ketones such as acetone, methyl ethyl ketone, methyl isobutyl ketone or cyclohexanone; esters such as methyl acetate, ethyl acetate, butyl acetate, ethyl lactate or monoethyl ether of glycol acetate; glycol ethers such as ether, glycol dimethyl ether, glycol monoethyl ether or dioxane; aromatic hydrocarbons such as benzene, toluene or xylene; and chlorinated hydrocarbons such as methylene chloride, ethylene chloride, carbon tetrachloride, chloroform, ethylene chlorohydrin, or dichlorobenzene.

Additives such as a lubricating agent, an abrasive agent, a dispersing agent, an antistatic agent or a rust preventing agent can be added to the magnetic coating composition of the present invention.

A lubricating agent includes a saturated and unsaturated higher fatty acid, fatty acid ester, higher fatty acid amide, higher alcohol, silicone oil, mineral oil, edible oil and a fluorocarbon compound, which can be added when a coating composition is prepared, or can be coated or sprayed on the surface of a magnetic layer with or without an organic solvent after drying, smoothing the magnetic layer or curing the magnetic layer by electron beams, in an amount of from 0.5 to 30 wt%, preferably from 1 to 20 wt% based on the amount of the ferromagnetic particles.

Examples of abrasive agent which can be used include those materials generally used such as fused alumina, silicon carbide, chromium oxide, corundum, artificial corundum, diamond, artificial diamond, garnet, emery (major components: corundum and magnetite), and the like. These abrasive agents have a Mohs' hardness of not less than about 5, and a mean particle size of from 0.05 to about 5 $\mu$m, preferably from 0.1 to 2 $\mu$m. These abrasive agent can be employed in an amount of about 0.5 to 20 parts by weight per 100 parts by weight of the binder. These are described in detail in Japanese Patent Publication Nos. 18572/72, 15003/73, 15004/73 (U.S. Pat. No. 3,617,378), 39402/74, 9401/75, U.S. Pat. Nos. 3,007,807, 3,041,196, 3,293,066, 3,630,910, 3,687,725, British Pat. No. 1,145,349, West German Pat. (DT-PS) Nos. 853,211, 1,101,000.

Examples of antistatic agents which can be used include electrically conductive powders such as carbon black, graphite carbon black-graft polymer, etc.; natural surface active agents such as saponin; nonionic surface active agents of the alkylene oxide type, glycerin type, glycidol type, etc.; cationic surface active agents such as higher alkylamines, quaternary ammonium salts, pyridine or like heterocyclic compounds, phosphoniums, sulfoniums, etc.; anionic surface active agents containing acidic groups such as carboxylic acid groups, sulfonic acid groups, phosphoric acid groups, sulfate groups, phosphate groups, etc.; amphoteric surface active agents such as aminoacids, aminosulfonic acids, sulfuric acid to phosphoric acid esters of aminoalcohols, etc.

The above-described electrically conductive powders can be used within the range of from 0.2 to 20 parts by weight per 100 parts by weight of the binder, and the surface active agents can be employed within the range of about 0.1 to about 10 parts per 100 parts by weight of the binder.

Examples of these electrically conductive powders and surface active compounds usable as antistatic agents are described in Japanese Patent Publication Nos. 22726/71, 24881/72, 26882/72, 15440/73, 26761/73, U.S. Pat. No. 2,271,623, 2,240,472, 2,288,226, 2,676,122, 2,676,924, 2,676,975, 2,691,566, 2,727,860, 2,730,498, 2,742,379, 2,739,891, 3,068,101, 3,158,484, 3,201,253, 3,210,191, 3,294,540, 3,415,649, 3,441,413, 3,442,654, 3,475,174, 3,545,974, West German Patent Application (OLS) No. 1,942,665, British Pat. Nos. 1,077,317, 1,198,450, etc. and, in addition, in references such as Ryohei Oda et al; *Synthesis and Application of Surface Active Agents* (Maki Shoten, 1964), A. M. Schwartz and J. W. Perry; *Surface Active Agents* (Interscience Publications Inc., 1958), J. P. Sisley; *Encyclopedia of Surface Active Agents*, vol. 2 (Chemical Publishing Co., 1964), *Handbook of Surface Active Agent*, 6th Printing (Sangyo Tosho Co., Ltd., Dec. 20, 1966), etc.

Examples of the rust preventing agents which can be used include phosphoric acid, sulfamide, guanidine, pyridine, amine, urea, zinc chromate, calcium chromate, strontium chromate, etc. Particularly, vaporatine rust preventing agents, i.e., inorganic or organic sults of amine, amide or imide, such as dicyclohexylamine nitrite, cyclohexylamine chromate, diisopropylamine nitrite, diethanolamine phosphate, cyclohexylamonium carbonate, propylenediamine stearate, gnanidine carbonate, triethanolamine nitrite, morpholine stearate etc. are much effective to rust preventing. These rust preventing agents can be used in an amount of from 0.01 to 20 parts by weight per 100 parts by weight of the binder.

Thickness of a magnetic layer, in which the binder of the present invention is used therein, is in the range of from 0.5 to 10 μm, preferably from 1 to 5 μm.

Methods for providing the magnetic layer, in which the binder of the present invention is used therein, are disclosed in U.S. Pat. No. 4,135,016.

Materials for the support used for coating a magnetic coating composition include polyesters such as polyethylene terephthalate or polyethylene-2,6-naphthalate; polyolefins such as polyethylene or polypropylene; cellulose derivatives such as cellulose triacetate; plastics such as polycarbonate, polyimide or polyamide imide; non-magnetic metals such as aluminum, copper, tin, zinc or non-magnetic alloy including the above metals; plastics having a vapor-deposited metal layer such as aluminum; and a paper or a paper coated or laminated with polyolefins.

The shape of the non-magnetic support can be a film, a tape, a sheet, a disc, a card or a drum, and various materials can be selected depending upon the above shapes.

A backing layer can be provided on the support on the surface opposite to the magnetic layer for the purpose of preventing static charging, print through and wow flutter, improving the strength of the magnetic recording medium and making the back side of the support matted.

A scanning method, a double scanning method, a curtain beam method or a broad beam curtain method can be employed for accelerating electron beams.

The electron beam radiation can be carried out using an accelerating voltage of 100 to 1,000 kV, preferably 150 to 300 kV, and an absorption dose of 1.0 to 20 megarads, preferably 2 to 10 megarads. When the accelerating voltage is 100 kV or less, the amount of energy transmitted is insufficient and when the accelerating voltage is 1,000 kV or more, the energy efficiency used for polymerization is lowered and is uneconomical. When the absorption does is 1.0 megarad or less, the curing reaction is insufficient to obtain a magnetic layer having a sufficient mechanical strength. When the absorption dose is 20 megarads or more, the energy efficiency used for curing reaction is lowered or a radiated object generates heat whereby a plastic support tends to deform.

The present invention is further illustrated in more detail by the following non-limiting Examples, Comparative Examples, Synthesis Examples and Comparative Synthesis Examples. In Examples and Comarative Examples, all parts are by weight unless oftherwise indicated.

SYNTHESIS EXAMPLES 1 TO 4

Synthesis of polyester polyol 1,168 g (8 moles) of adipic acid, 1,165 g (11.2 moles) of neopentyl glycol and 297.6 g (4.8 moles) of ethylene glycol were introduced into a 3 liter flask, heated at 180° C. and stirred to conduct dehydration and esterification for 5 hours. 2.6 g (0.1 wt%) of tetrabutyl titanate was added as a catalyst thereto. Then, 368 g of a mixture of ethylene glycol and neopentyl glycol was taken out at 180° C. under 2 to 10 mmHg abs. and OH value was analyzed and found to be 210 mg KOH/g. Assuming that the resulting compound has OH group at both terminals and that the mixing ratio of neopentyl glycol and ethylene glycol of the resulting compound is the same as the initial one, the condensation degree m was calculated and found to be m=2.2. The resulting compound is named as Compound 1.

Compounds 2 to 4 were synthesized in the same manner as in Synthesis Example 1 except for changing the kinds of starting materials, amounts to be introduced and the amounts to be taken out at polycondensation under vacuum.

The syntheses results of Compounds 1 to 4 are shown in Table 1.

TABLE 1

|  | Amounts of Glycol (g) | Amounts of Dicarboxylic Acid (g) | Amount to be Taken out at Polycondensation under Vacuum (g) | Polyester Polyol Number Average Molecular Weight | Average Condensation Degree (m) |
|---|---|---|---|---|---|
| Compound 1 | NpG 1,165 EG 297.6 | Ad 1,168 | 368 | 532 | 2.2 |
| Compound 2 | TMG 1,080 | Ad 876 | 285 | 513 | 2.1 |
| Compound 3 | TMG 1,080 | Ad 876 | 379 | 705 | 3.1 |
| Compound 4 | NpG 1,165 EG 297.6 | Ad 1,168 | 633.3 | 2,005 | 9.5 |

Abbreviations in Table 1 are as follows.
NpG: Neopentyl Glycol
EG: Ethylene Glycol
TMG: Tetramethylene Glycol
Ad: Adipic Acid

SYNTHESIS EXAMPLE 5

First Step Reaction 26.4 g of tolylene diisocyanate and 0.03 g of dibutyl tin laurate as a catalyst were introduced into a 500 cc flask where air had been purged by dried $N_2$ gas, heated to 75° to 80° C., and 80.4 g of Compound 1 was added dropwise in about 1 hour and the mixture was reacted for additional 1 hour.

Second Step Reaction

While the reaction solution of the first step was kept at 75° to 80° C., 9.7 g tolylene disocyanate, 0.03 g of hydroquinone monomethyl ether and 0.03 g of dibutyl tin laurate were added thereto and 85.6 g of bis-2-acryloyloxyether-hydroxyether isocyanate ("Aronics M 215", a trade mark for product manufactured by Toagosei Chemical Industry Co., Ltd.) was added dropwise in 0.5 hour thereto. Then, the mixture was reacted for additional 6 hours. A viscous compound was obtained after confirming by infrared absorption spectral analysis that the absorption peak at 2260 $cm^{-1}$ disappeared.

It was calculated from the amounts of the starting materials that the urethane condensation degree (N) of the compound was found to be 3, and the equivalent amount of acryloyl group in 1 g of the compound was $2.03 \times 10^{-3}$ g equivalent. The results of the synthesis are shown in Table 2.

SYNTHESIS EXAMPLE 6 AND COMPARATIVE SYNTHESIS EXAMPLES 1 TO 3

The same procedures as in Synthesis Example 5 were repeated except for changing the kinds of starting materials and amounts thereof to prepare binders. Synthesis results of Synthesis Example 6 and Comparative Synthesis Examples 1 to 3 are shown in Talbe 2.

the magnetic layer received an absorption dose of 10 Mrad. The resulting sample was identified as Sample No. 1.

EXAMPLE 2 AND COMPARATIVE EXAMPLES 1 TO 3

The same procedures as in Example 1 were repeated except that the binder used in Example 1 was changed to those as shown in Table 3 to obtain Sample Nos. 2 to 5.

TABLE 2

|  | Amounts Introduced in the First Step Reaction | | Amounts Introduced in the Second Step Reaction | | Urethane Condensation of Degree N | Equivalent A in 1 g of the Compound |
|---|---|---|---|---|---|---|
|  | Starting Material DI (g) | Starting Material PO (g) | Starting Material DI (g) | A-Containing Compound (g) |  |  |
| Synthesis Example 5 | TDI 26.4 | Compound 3 80.4 | TDI 7.6 | M215 85.6 | 3 | $2.03 \times 10^{-3}$ |
| Synthesis Example 6 | TDI 33.5 | Compound 1 85.4 | TDI 7.6 | THEIC—CL—CA 73.4 | 5 | $1.52 \times 10^{-3}$ |
| Comparative Synthesis Example 1 | IPDI 35.5 | Compound 1 81.3 | IPDI 12.7 | FA-1 57.1 | 3 | $1.25 \times 10^{-3}$ |
| Comparative Synthesis Example 3 | TDI 43.2 | Compound 2 114.5 | TDI 4.6 | M215 37.7 | 9 | $1.03 \times 10^{-3}$ |
| Comparative Synthesis Example 2 | IPDI 17.7 | Compound 4 106.6 | IPDI 13.0 | M215 64.6 | 2 | $1.70 \times 10^{-3}$ |

Abbreviations used in Table 2 are as follows:
DI: Diisocyanate Compound
PO: Polyol Compound
A: Acryloy Group
TDI: Tolylene Diisocyanate
M215: Bis-2-acryloyloxyether-hydroxyether Isocyanurate ("Aronics M-215" ®, a trademark for a product manufactured by Toagosei Chemical Industry Co., Ltd.)
IPDI: Isophorone Diisocyanate
FA-1: $CH_2=CH-CO_2C_2H_4OCO(CH_2)_5OH$
THEIC—CL—DA:

$$H+O(CH_2)_{10}CO+_{l}C_2H_4-N \begin{array}{c} O \\ \parallel \\ C \\ \end{array} N-C_2H_4O(OC(CH_2)_5O)_mCOCH=CH_2$$

$$O= \overset{}{\underset{N}{\diagdown}} =O$$

$$\underset{|}{N}$$

$$C_2H_4O(OC(CH_2)_5O)_nCOCH=CH_2$$

$l + m + n = 1$

EXAMPLE 1

$\gamma-Fe_2O_3$ (Hc: 650 Oe, 0.5 μm × 0.05 μm): 400 parts
Compound of Synthesis Example 5: 100 parts
Lecithin: 4 parts
Stearic Acid: 4 parts
Butyl Stearate: 4 parts
$Al_2O_3$: 4 parts
Carbon Black: 10 parts
Methyl Ethyl Ketone: 800 parts The above composition was mixed and kneaded in a ball mill for 50 hours to obtain a magnetic coating composition, which was then coated by a doctor blade coating on a polyethylene terephthalate support having a thickness of 15 μm to have a dry thickness of 5 μm. The thus obtained magnetic layer was subjected to magnetic orientation using cobalt magnets and the solvent was evaporated at 100° C. for 1 min. Then, the magnetic layer was subjected to smoothing treatment at a roll temperature of 60° C. by calender rolls composed of five pairs of rolls, each pair comprising a cotton roll and a mirror roll.

An electron beam having an accelerating voltage of 165 kV and a beam current of 8 A was radiated so that

TABLE 3

|  | Binder | Sample No. |
|---|---|---|
| Example 2 | Compound of Synthesis Example 5 | 2 |
| Comparative Example 1 | Compound of Comparative Synthesis Example 1 | 3 |
| Comparative Example 2 | Compound of Comparative Synthesis Example 2 | 4 |
| Comparative Example 3 | Compound of Comparative Synthesis Example 3 | 5 |

Regarding Sample Nos. 1 to 7, (1) video head stain after repeated use of the tapes at 40° C. and (2) decrease in video output after repeated use of the tapes at 40° C. were checked and the results are shown in Table 4.

TABLE 4

| Sample No. | Video Head Stain | Decrease in Video Output (dB) |
|---|---|---|
| 1 | A | −0.2 |
| 2 | A | −0.3 |
| 3 | B | −2.3 |
| 4 | B | −3.4 |
| 5 | C (Clogging of Video Head Occurred) | −2.6 |

Video head stain and decrease in video output were evaluated in the following manner.

Video Head Stain

Video head stain was observed and evaluated comparatively after sample video tapes were run for 100 passes at 40° C. and 60% RH using a VHS video tape recorder ("NV-8200", a trade name, manufactured by Matsushita Electric Industrial Co., Ltd.).
A: Head stain was not observed.
B: Head stain was observed.
C: Stain at head gap was observed.

Decrease in Video Output

Grey signals at 50% set up were recorded on a video tape recorder "NV-8200" and the video output was measured by a S/N meter, "925 C", a trade name, manufactured by Shibasoku Co., Ltd.. Assuming that the initial output of each sample is a standard (0 dB), the decrease in video output after the tapes were run for 100 passes was shown in terms of dB. The tapes were run at 40° C. and 60% RH.

It is apparent from the results in Table 4 that the present invention is excellent in durability, particularly at a high temperature of 40° C.

The magnetic recording medium of the present invention has excellent electromagnetic properties, the magnetic layer is mechanically strong, the storage stability of the magnetic coating composition is excellent, the durability particularly at a high temperature of 40° C. is excellent and heat treatment for hardening a coated layer is unnecessary.

While the invention has been described in detail and with reference to specific embodiments thereof, it will be apparent to one skilled in the art that various changes and modifications can be made therein without departing from the spirit and scope thereof.

What is claimed is:

1. A magnetic recording medium prepared by the process comprising (1) coating a magnetic coating composition mainly containing ferromagnetic particles and a binder on a support and (2) irradiating the resulting support with electron beams, wherein the binder contains a compound represented by the following formula,

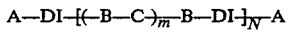

wherein A represents a radical of a hydroxy compound containing at least one isocyanurate ring and at least one (meth)acryloyl group; DI represents a radical of an organic diisocyanate compound; B represents a radical of a polyol having at least two hydroxy groups; C represents a radical of a polybasic acid having at least two carboxy groups; m is a number of 1 to 7; and N is a positive number of 7 or less.

2. The magnetic recording medium as claimed in claim 1, wherein A is selected from the group consisting of radicals of monoacrylate, diacrylate, monomethacrylate and dimethacrylate of an adduct with tris-2-hydroxyethyl isocyanurate or tris-2-hydroxyethyl isocyanurate.

3. The magnetic recording medium as claimed in claim 2, wherein A is selected from the group consisting of radicals of diacrylate and dimethyacraylate of an adduct with tris-2-hydroxyethyl isocyanurate or tris-2-hydroxyethyl isocyanurate.

4. The magnetic recording medium as claimed in claim 1, wherin DI is selected from the group consisting of radicals of 2,4-tolylene diisocyanate 2,6-tolylene diisocyanate, 1,3-xylene diisocyanate, 1,4-xylene diisocyanate, diphenylmethane-4,4'-diisocyanate, naphthalene diisocyanate, tolidine diisocyanate, isophoron diisocyanate and dicyclohexylmethane-4,4'-diisocyanate.

5. The magnetic recording medium as claimed in claim 1, wherin B is selected from the group consisting of radicals of trimethylene glycol, butanediol, neopentyl glycol, hexanediol, cyclohexanediol, a dihydric alcohol containing these dihydric alcohols in an amount of 50 mole% or more and trimethylolpropane.

6. The magnetic recording medium as claimed in claim 5, wherein B is selected from the group consisting of radicals of trimethylene glycol, butanediol, neopentyl glycol, hexanediol, cyclohexanediol.

7. The magnetic recording medium as claimed in claim 1, wherin C is selected from the group consisting of radicals of adipic acid, sebacic acid, cyclohexanedicarboxylic acid, phthalic acid, isophthalic acid, terephthalic acid and trimellitic acid.

8. The magnetic recording medium as claimed in claim 7, wherein C is selected from the group consisting of radicals of adipic acid, sebacic acid, cyclohexanedicarboxylic acid, phthalic acid, isophthalic acid and terephthalic acid.

9. The magnetic recording medium as claimed in claim 1, wherein the content of said (meth)acryloyl group in said binder is about 0.0010 to 0.0022 g equivalents/g of said binder.

10. The magnetic recording medium as claimed in claim 1, wherein irradiating is conducted using an electron voltage of 150 to 300 kV and an adsorption dose of 2 to 10 megarads.

* * * * *